US009628602B2

(12) United States Patent
Takagi

(10) Patent No.: US 9,628,602 B2
(45) Date of Patent: Apr. 18, 2017

(54) COMMUNICATION APPARATUS AND CONTROL METHOD THEREFOR

(71) Applicant: CANON KABUSHIKI KAISHA, Tokyo (JP)

(72) Inventor: Toshiyuki Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/013,884

(22) Filed: Feb. 2, 2016

(65) Prior Publication Data

US 2016/0227014 A1 Aug. 4, 2016

(30) Foreign Application Priority Data

Feb. 4, 2015 (JP) ................................ 2015-020642

(51) Int. Cl.

*H04B 5/00* (2006.01)
*H04M 1/00* (2006.01)
*H04M 1/725* (2006.01)
*H04W 4/00* (2009.01)
*H04W 76/02* (2009.01)
*H04W 84/12* (2009.01)

(52) U.S. Cl.

CPC ......... *H04M 1/7253* (2013.01); *H04W 4/008* (2013.01); *H04W 76/02* (2013.01); *H04M 2250/02* (2013.01); *H04M 2250/06* (2013.01); *H04W 84/12* (2013.01)

(58) Field of Classification Search

CPC ...... H04B 1/04; H04B 1/0214; H04B 10/114; H04M 1/04; H04M 1/0214; H04M 1/0245; H04M 1/026; H04M 1/7253; H04M 2201/38; H04M 2250/16; H04M 2250/38

USPC ....... 455/41.1, 41.2, 556.1, 557, 566, 575.1, 455/575.3, 575.4

See application file for complete search history.

(56) References Cited

U.S. PATENT DOCUMENTS 6,424,843 B1 * 7/2002 Reitmaa .............. H04M 1/0208 455/556.1
7,127,271 B1 * 10/2006 Fujisaki ................ H04M 1/271 455/550.1
8,279,252 B2 * 10/2012 Hamada ................ H04N 7/147 348/14.01

(Continued)

FOREIGN PATENT DOCUMENTS

JP 2002-204239 A 7/2002

*Primary Examiner* — Quochien B Vuong
(74) *Attorney, Agent, or Firm* — Canon U.S.A., Inc. IP Division

(57) ABSTRACT

A control method for a communication apparatus that includes a movable display unit movable into a first state in which a display screen faces a casing of the communication apparatus and a second state in which the display screen does not face the casing of the communication apparatus includes receiving a predetermined communication start request, via a first communication method, for communication with an external apparatus, displaying information for predetermined communication on the display unit, and performing the predetermined communication using the information for the predetermined communication after the predetermined communication start request is received, wherein, if the display unit is in the first state, the external apparatus recognizes that the predetermined communication cannot be performed.

16 Claims, 10 Drawing Sheets

(56) References Cited

U.S. PATENT DOCUMENTS

| | | | | |
|---|---|---|---|---|
| 8,838,024 B2 * | 9/2014 | Iwasaki | H04B 5/00 | |
| | | | 455/41.1 | |
| 8,855,721 B2 * | 10/2014 | Sakurai | H01Q 1/243 | |
| | | | 455/566 | |
| 9,055,171 B2 * | 6/2015 | Fujinawa | H04N 1/00127 | |

* cited by examiner

COMMUNICATION APPARATUS AND CONTROL METHOD THEREFOR

BACKGROUND

Field

Aspects of the present invention generally relate to a communication apparatus that can be connected to an external apparatus.

Description of the Related Art

A technique for performing authentication using close proximity wireless communication, such as Near Field Communication (NFC), and handing over the communication via wireless local area network (LAN) communication has recently received attention.

A system employing such a technique is conventionally known. For example, NFC communication can be performed between a digital camera and a mobile phone as close proximity wireless communication to exchange information needed for wireless LAN connection, so that wireless LAN communication can be performed. One example of the system is discussed in Japanese Patent Application Laid-Open No. 2002-204239.

In such a system, guidance may be displayed to a user in the course of establishing communication. Then, a sequence proceeds upon receipt of a predetermined operation from a user.

SUMMARY

According to an aspect of the present invention, a communication apparatus includes a first communication unit configured to communicate with an external apparatus using a first communication method, a movable display unit movable into a first state in which a display screen faces a casing of the communication apparatus and a second state in which the display screen does not face the casing of the communication apparatus, and a control unit. If the first communication unit receives a predetermined communication start request, the control unit controls information, displayed on the display unit, for predetermined communication with the external apparatus, wherein, after the predetermined communication start request is received, the control unit performs control such that the predetermined communication is performed using the information for the predetermined communication, and if the display unit is in the first state, the control unit performs control such that the external apparatus recognizes that the predetermined communication cannot be performed.

Further features of aspects of the present invention will become apparent from the following description of exemplary embodiments with reference to the attached drawings.

DESCRIPTION OF THE EMBODIMENTS

Exemplary embodiments of aspects of the present invention are described in detail below with reference to the drawings.

<Configuration of Digital Camera 100>

Figure 1:
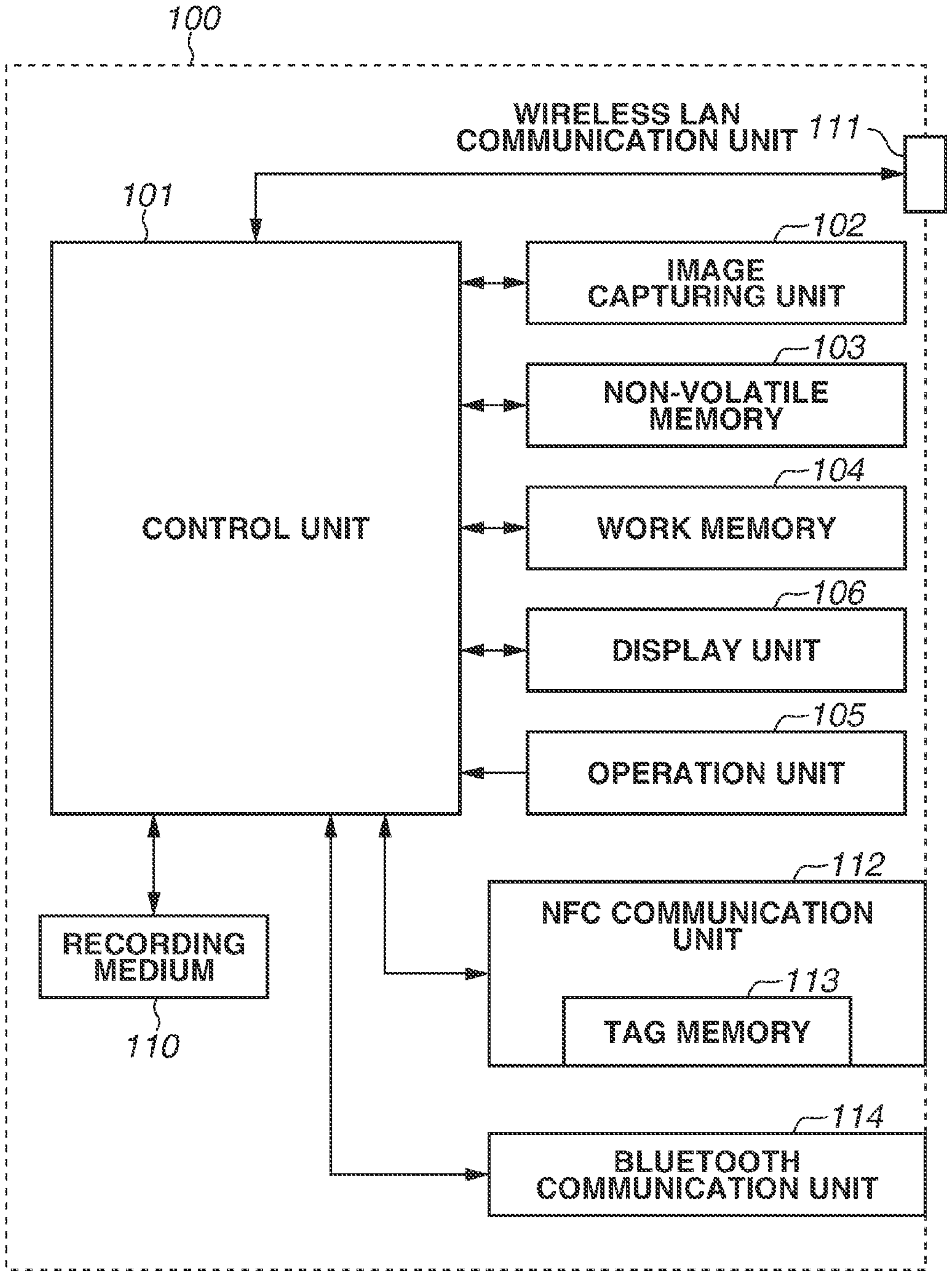
FIG. 1 is a block diagram illustrating a configuration of a digital camera.

FIG. 1 is a block diagram illustrating a configuration example of a digital camera 100 as one example of a communication apparatus of the present exemplary embodiment. Herein, the digital camera 100 is described as one example of the communication apparatus, but the communication apparatus is not limited thereto. For example, the communication apparatus may be a portable media player, and an information processing apparatus such as a tablet device and a personal computer.

A control unit 101 controls each unit of the digital camera 100 according to an input signal or a program described below to perform processing such as image capturing control, storage control, display control, and communication control. The entire apparatus may be controlled by a plurality of hardware units, instead of the control unit 101 controlling the entire apparatus. In such a case, the plurality of hardware units shares the processing, respectively.

An image capturing unit 102 includes, for example, an optical system and an image capturing element. The optical system controls an optical lens unit and aperture/zoom/focus. The image capturing element converts light (image) introduced via the optical lens unit into electric image signals. In general, a complementary metal-oxide-semiconductor (CMOS), or a charge-coupled device (CCD) is used as the image capturing element. The image capturing unit 102 is controlled by the control unit 101 to convert object light focused by a lens of the image capturing unit 102 into the electric signals by using the image capturing element. Subsequently, the image capturing unit 102 reduces noise of the electric signals, and outputs the obtained digital data as image data. In the digital camera 100 of the present exemplary embodiment, the image data is stored in a recording medium 110 according to standards for Design rule for Camera File System (DFC).

A non-volatile memory 103 is capable of electrically deleting and recording data, for example. In the non-volatile memory 103, a program to be executed by the control unit 101 is stored. The program will be described below.

A work memory 104 is used as a buffer memory for temporarily storing the image data captured by the image capturing unit 102. The work memory 104 is also used as an image display memory for a display unit 106 and a work area for the control unit 101.

An operation unit 105 is used to receive an instruction issued to the digital camera 100 from a user. The operation unit 105, for example, includes a power button, a release switch, a moving image capturing switch, and a playback button that are operated by the user. The power button is configured to issue an ON/OFF instruction for turning on/off a power source of the digital camera 100. The release switch is configured to issue an image capturing instruction. The moving image capturing switch issues a moving image capturing instruction, and the playback button issues an image data playback instruction. Moreover, the operation unit 105 includes an operation member such as a connection button dedicated to the start of communication with an external device via a wireless LAN communication unit 111 that will be described below. In addition, the operation unit 105 includes a touch panel provided on a display unit 106 that will be described below. The release switch includes a switch SW1 and a switch SW2. When the release switch is pressed halfway, the switch SW1 is turned on. Thus, the operation unit 105 receives an instruction for image capturing preparation such as auto-focus (AF) processing, auto-exposure (AE) processing, automatic white balance (AWB) processing, and pre-flash (EF) processing. When the release switch is pressed all the way down, the switch SW2 is turned on. Thus, the operation unit 105 receives an image capturing instruction.

The display unit 106 serving as a variable angle monitor (hereinafter referred to as a vari-angle monitor) includes a liquid crystal monitor 116 and a hinge 115 that will be described below. The liquid crystal monitor 116 displays a viewfinder image when an image is captured. Moreover, the liquid crystal monitor 116 displays data of the captured image, and a text for interactive operation. The liquid crystal monitor 116 can include a touch panel, so that the liquid crystal monitor 116 can have at least part of the functions of the display unit 106 and the operation unit 105.

The recording medium 110 can record the image data output from the image capturing unit 102. The recording medium 110 can be configured to be detachable from the digital camera 100 or incorporated into the digital camera 100. That is, the digital camera 100 only has to include at least a means for accessing the recording medium 110.

The wireless LAN communication unit 111 serves as an interface for connecting to an external device. The digital camera 100 of the present exemplary embodiment can exchange data with the external device via the wireless LAN communication unit 111. For example, the image data generated by the image capturing unit 102 can be transmitted to the external device via the wireless LAN communication unit 111. In the present exemplary embodiment, the wireless LAN communication unit 111 serves as an interface conforming to Institute of Electrical and Electronics Engineers (IEEE) 802.11 standards to communicate with the external device via a wireless LAN. The control unit 101 controls the wireless LAN communication unit 111, thereby wirelessly communicating with the external device. A communication method is not limited to the wireless LAN. For example, wired communication such as Ethernet (trademark) may also be used.

An NFC communication unit 112 includes an antenna for wireless communication, a modulation demodulation circuit for processing a wireless signal, and a communication controller. The NFC communication unit 112 outputs a modulated wireless signal from the antenna, and demodulates a wireless signal received by the antenna, thereby performing contactless close proximity communication conforming to International Organization for Standardization/International Electrotechnical Commission (ISO/IEC) 18092 standards (i.e., NFC). The NFC communication unit 112 of the present exemplary embodiment is arranged on a lateral side of the digital camera 100.

When the NFC communication unit 112 of the digital camera 100 and a NFC communication unit 309 of a mobile phone 300 that will be described below are brought near to each other, the digital camera 100 and the mobile phone 300 start communicating and are connected. In this case, the NFC communication unit 112 and the NFC communication unit 309 do not necessarily contact each other since the communication can be performed even if the NFC communication units 112 and 309 are separated a certain distance. Accordingly, when the digital camera 100 and the mobile phone 300 are connected to each other, the NFC communication units 112 and 309 only have to be brought near in a close proximity wireless communicable range. Hereinafter, the expression "to be brought near in the close proximity wireless communicable range" is also expressed as "to be brought in close proximity".

Further, in a case where the NFC communication unit 112 and the NFC communication unit 309 are outside the close proximity wireless communicable range, the communication is not started. In a case where the NFC communication unit 112 and the NFC communication unit 309 are in the close proximity wireless communicable range, the digital camera 100 and the mobile phone 300 are communicably connected. In such a state, if the NFC communication unit 112 and the NFC communication unit 309 are separated to the outside of the close proximity wireless communicable range, the communication is disconnected. The contactless close proximity communication performed by the NFC communication unit 112 is not limited to the NFC. Alternatively, other wireless communication may be employed. For example, contactless close proximity communication conforming to ISO/IEC 14443 standards may be employed as contactless close proximity communication to be performed by the NFC communication unit 112.

A tag memory 113 can be read or data can be written from the control unit 101. With the close proximity wireless communication, the tag memory 113 can also be read and data can be written from an external device having an NFC reader/writer function. In a case where the tag memory 113 performs close proximity wireless communication with the external device, the communication is controlled using electric power generated by electromagnetic induction at the time of receipt of electric waves supplied from the external device. Hence, even if the digital camera 100 is in a power-off state, the tag memory 113 can be read and data can be written from the external device. In the present exemplary embodiment, an interrupt signal is input into the control unit 101 in response to the writing in the tag memory 113, so that the control unit 101 can detect that the external device is brought in close proximity.

A Bluetooth (trademark) communication unit 114 executes communication conforming to the Bluetooth (trademark) standard. The digital camera 100 performs Bluetooth (trademark) communication with the mobile phone 300 via the Bluetooth (trademark) communication unit 114.

The wireless LAN communication unit 111 of the digital camera 100 according to the present exemplary embodiment includes an access point (AP) mode and a client (CL) mode. In the AP mode, the digital camera 100 operates as an access point in an infrastructure mode. In the CL mode, the digital camera 100 operates as a client in the infrastructure mode. When the wireless LAN communication unit 111 is operated in the CL mode, the digital camera 100 of the present exemplary embodiment can operate as a CL device in the infrastructure mode. In a case where the digital camera 100 operates as the CL device, the digital camera 100 can be connected to an AP device put on the periphery thereof. Such connection enables the digital camera 100 to participate in a network formed by the AP device. Moreover, the operation of the wireless LAN communication unit 111 in the AP mode allows the digital camera 100 to form a network. A device on the periphery of the digital camera 100 identifies the digital camera 100 as an AP device. This enables the peripheral device to participate in the network formed by the digital camera 100. Such a program for operating the digital camera 100 is stored in the non-volatile memory 103.

The digital camera 100 according to the present exemplary embodiment is of one type of the APs. However, the digital camera 100 can operate as a simplified AP (hereinafter referred to as a simple AP) that has limited functions. The simple AP of the digital camera 100 in the present exemplary embodiment does not have a gateway function of transferring data received from a CL device to an Internet provider. Consequently, even if the digital camera 100 receives data from another device participating in the network formed thereby, the data cannot be transferred to a network such as the Internet.

<Positional Relation Between Digital Camera Body and Vari-Angle Monitor>

FIGS. 2A, 2B, 2C, and 2D are diagrams illustrating a positional relation between the digital camera body and a vari-angle monitor. The display unit 106 serving as the vari-angle monitor includes the liquid crystal monitor 116 and the hinge 115. The display unit 106 is movably coupled to the digital camera 100 with the hinge 115. Thus, the display unit 106 can be rotated, opened, and closed with respect to the digital camera 100.

Figure 2A:
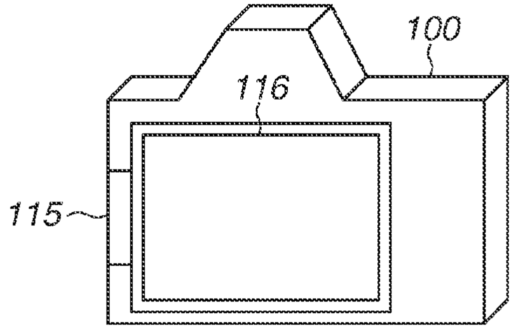
FIGS. 2A, 2B, 2C, and 2D are external views illustrating the digital camera.

In FIG. 2A, the display unit 106 is fitted on the back of the body (casing) of the digital camera 100. A positional relation between the body of the digital camera 100 and the display unit 106 illustrated in FIG. 2A is in a first position state. Herein, the liquid crystal monitor 116 is facing toward the rear side relative to the digital camera 100. That is, a display surface of the liquid crystal monitor 116 is not facing the body of the digital camera 100.

Figure 2B:
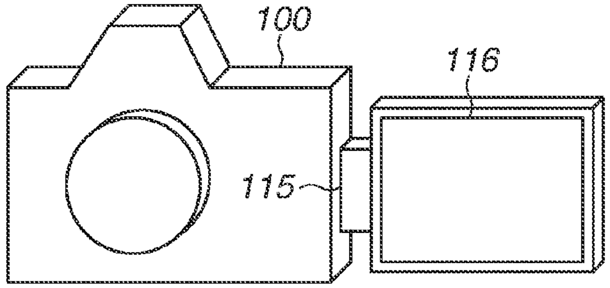

In FIG. 2B, the display surface of the liquid crystal monitor 116 is facing toward an object side (a direction opposite to the digital camera 100). The positional relation illustrated in FIG. 2B is in a second position state. When the display unit 106 is laterally rotated by 180 degrees (rotated by 180 degrees around a rotation axis which is perpendicularly pointing with respect to the digital camera 100) from the state illustrated in FIG. 2A, the positional relation is changed to the state illustrated in FIG. 2B.

Figure 2C:
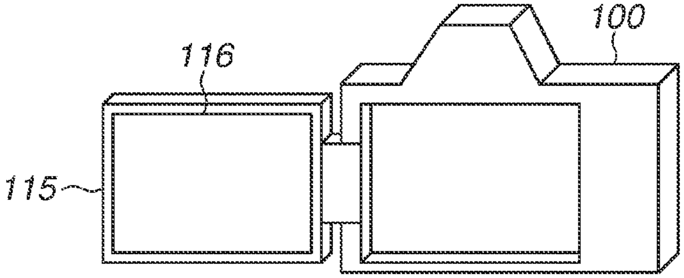

In FIG. 2C, the liquid crystal monitor 116 is facing toward the rear side relative to the digital camera 100. The positional relation illustrated in FIG. 2C is in a third position state. When the display unit 106 is longitudinally rotated by 180 degrees (rotated by 180 degrees around the rotation axis which is horizontally pointing with respect to the digital camera 100) from the state illustrated in FIG. 2B, the positional relation is changed to the state illustrated in FIG. 2C.

Figure 2D:
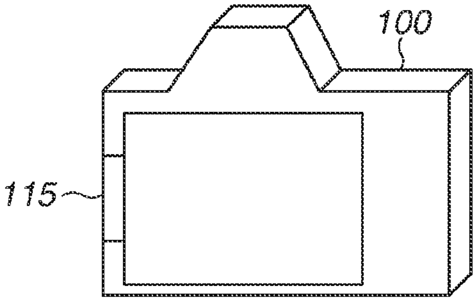

In FIG. 2D, the display unit 106 is fitted on the back of the digital camera 100 with the liquid crystal monitor 116 facing toward the object side relative to the digital camera 100. The positional relation illustrated in FIG. 2D is in a fourth position state. When the display unit 106 is laterally rotated by 180 degrees (rotated by 180 degrees around the rotation axis which is perpendicularly pointing with respect to the digital camera 100) from the state illustrated in FIG. 2C, the positional relation is changed to the state illustrated in FIG. 2D. In this state, a user of the digital camera 100 cannot view the liquid crystal monitor 116. In description below, the state illustrated in FIG. 2D is also referred to as a state in which the vari-angle monitor is closed. Other states are referred to as a state in which the vari-angle monitor is opened.

<Internal Configuration of Mobile Phone 300>

Figure 3:
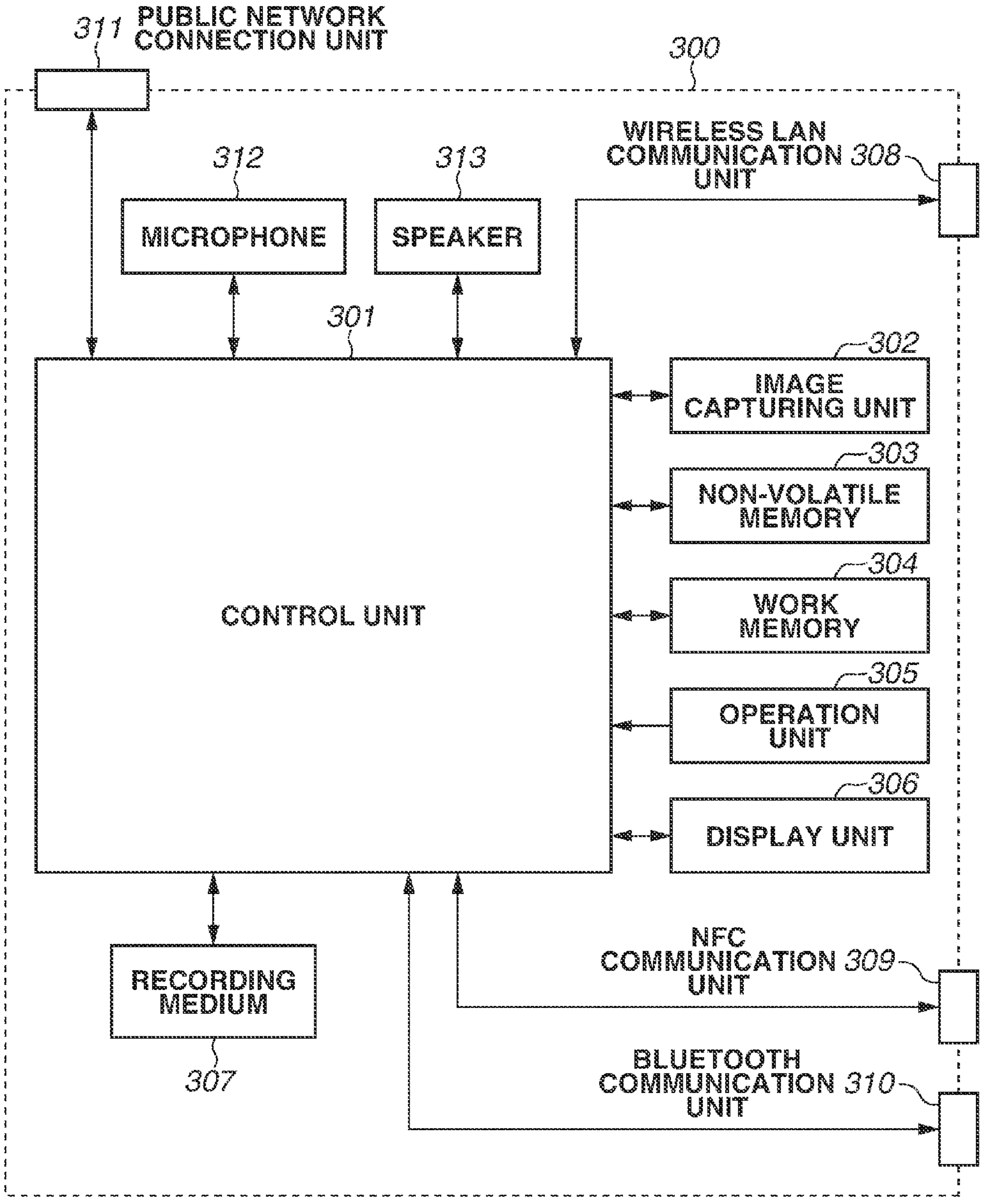
FIG. 3 is a block diagram illustrating a configuration of a mobile phone.

FIG. 3 is a block diagram illustrating a configuration of the mobile phone 300 as one example of an information processing apparatus according to the present exemplary embodiment. Herein, the mobile phone 300 is described as one example of the information processing apparatus. However, the information processing apparatus is not limited thereto. For example, the information processing apparatus can be a digital camera, a tablet device, or a personal computer with a wireless function.

A control unit 301 controls each unit of the mobile phone 300 according to an input signal or a program that will be described below. The entire apparatus may be controlled by a plurality of hardware units, instead of the control unit 301 controlling the entire apparatus. In such a case, the plurality of hardware units shares processing.

An image capturing unit 302 converts object light focused by a lens thereof into electric signals. Subsequently, the image capturing unit 302 reduces noise of the electric signals, and outputs the digital data as image data. After being stored in a buffer memory, the captured image data undergoes predetermined calculation in the control unit 301, and the resultant image data is recorded in a recording medium 307.

A non-volatile memory 303 can electrically delete and record data. In the non-volatile memory 303, an operating system (OS) and an application are recorded. The OS serves as basic software to be executed by the control unit 301 while the application provides an applied function collaborating with the OS. In the present exemplary embodiment, an application for communicating with the digital camera 100 is stored in the non-volatile memory 303.

A work memory 304 is used as an image display memory for a display unit 306 and a work area for the control unit 301.

An operation unit 305 is used to receive an instruction issued to the mobile phone 300 from a user. For example, the operation unit 305 includes a power button, and an operation member such as a touch panel formed on the display unit 306. The power button is used when a user issues an instruction to turn on/off a power source of the mobile phone 300.

The display unit 306 displays image data and a text for interactive operation. The mobile phone 300 does not necessarily include the display unit 306. The mobile phone 300 only has to be connected to the display unit 306, and to have at least a display control function of controlling a display of the display unit 306.

The recording medium 307 can record the image data output from the image capturing unit 302. The recording medium 307 can be configured to be detachable from the mobile phone 300 or incorporated into the mobile phone 300. That is, the mobile phone 300 only has to include at least a unit for accessing the recording medium 307.

A wireless LAN communication unit 308 serves as an interface for connecting to an external device. The mobile phone 300 according to the present exemplary embodiment can exchange data with the digital camera 100 via the wireless LAN communication unit 308. In the present exemplary embodiment, the wireless LAN communication unit 308 includes an antenna, and the control unit 301 can be connected to the digital camera 100 via the antenna. As for the connection to the digital camera 100, the control unit 301 can be connected directly, or connected via an access point. As for a protocol for data communication, for example, Picture Transfer Protocol over Internet Protocol (PTP/IP) through a wireless LAN can be used. However, the communication with the digital camera 100 is not limited thereto. For example, a wireless communication module such as an infrared-ray communication module and a wireless universal serial bus (USB) can be used instead of the wireless LAN communication unit 308. Further, wired connection such as a USB cable, High-Definition Multimedia Interface (HDMI) (trademark), and an IEEE 1394 interface can be employed.

The NFC communication unit 309 serves as a communication unit for performing contactless close proximity communication with other devices. The NFC communication unit 309 includes an antenna for wireless communication, a modulation demodulation circuit for processing wireless signals, and a communication controller. The NFC communication unit 309 outputs a modulated wireless signal from the antenna, and demodulates a wireless signal received by the antenna, thereby performing contactless close proximity communication. In this case, the contactless communication conforming to ISO/IEC 18092 standards (i.e., NFC) is performed. Upon receipt of a data readout request from another device, the NFC communication unit 309 outputs response data based on the data stored in the non-volatile memory 303. In the present exemplary embodiment, through the NFC communication unit 309, the mobile phone 300 operates in a card reader mode, a card writer mode, and a peer to peer (P2P) mode each defined by NFC standards, and acts as an initiator. Meanwhile, the digital camera 100 mainly acts as a target through the NFC communication unit 112.

A Bluetooth (trademark) communication unit 310 serves as a Bluetooth (trademark) wireless unit for executing Bluetooth (trademark) communication. The mobile phone 300 performs the Bluetooth (trademark) communication with the digital camera 100 via the Bluetooth (trademark) communication unit 310.

A public network connection unit 311 serves as an interface used when public wireless communication, for example, third generation of mobile phone standards and technology (3G) communication and Long Term Evolution (LTE) communication, is performed. The mobile phone 300 can call another device via the public network connection unit 311. In such a case, the control unit 301 can receive and output sound signals via a microphone 312 and a speaker 313, so that telephone conversation can be made. In the present exemplary embodiment, the public network connection unit 311 is an antenna, and the control unit 301 can be connected to the public network via the antenna. Alternatively, one antenna may function as the wireless LAN communication unit 308 and the public network connection unit 311.

<Network System Configuration>

Figure 4A:
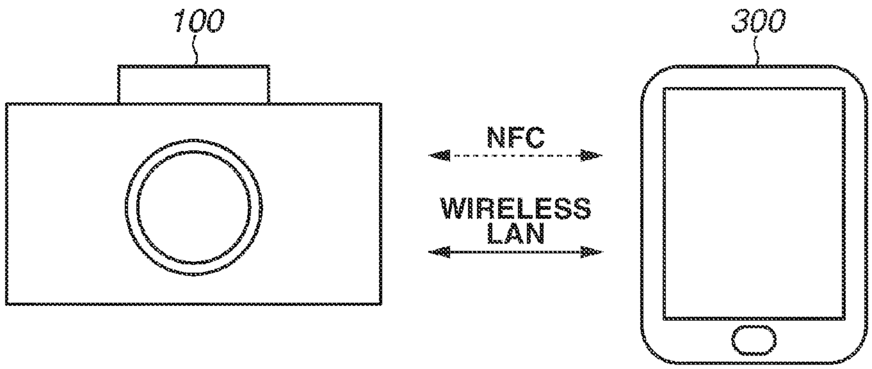
FIGS. 4A and 4B are diagrams each illustrating one example of a network configuration between the digital camera and the mobile phone.

FIG. 4A is a schematic diagram illustrating one example of a network system according to the present exemplary embodiment. In the present exemplary embodiment, a description is given of an example case in which the system allows the digital camera 100 and the mobile phone 300 to communicate via NFC or wireless LAN. As illustrated in FIG. 4A, the network system includes the digital camera 100 and the mobile phone 300. The digital camera 100 and the mobile phone 300 can communicate with each other by close proximity wireless communication according to an NFC method. Moreover, the digital camera 100 and the mobile phone 300 can wirelessly communicate with each other according to a wireless LAN method.

In the NFC method as described above, the mobile phone 300 having the reader/writer function executes communication according to the method for reading the information stored in the tag memory 113 of the digital camera 100.

In a case where the wireless LAN method is employed, on the other hand, the digital camera 100 has a simple AP function, and the mobile phone 300 executes communication according to a method for connecting in an infrastructure mode to a wireless LAN network generated by the digital camera 100.

Figure 4B:
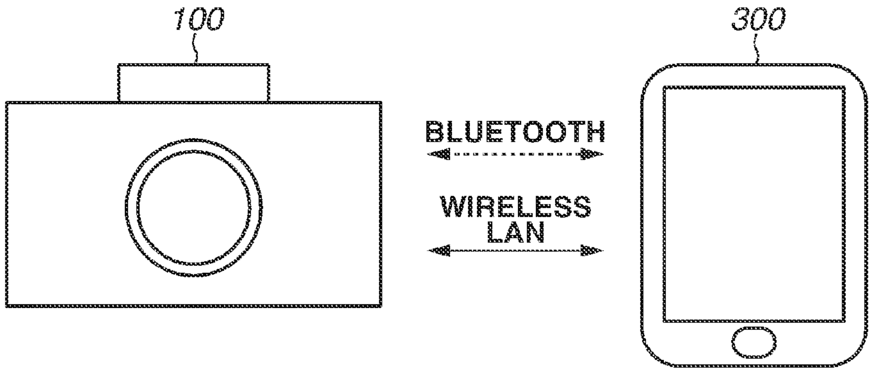

FIG. 4B is a schematic diagram illustrating one example of the network system according to the present exemplary embodiment. In the present exemplary embodiment, a description is given of an example case in which the system allows the digital camera 100 and the mobile phone 300 to communicate employing Bluetooth (trademark) or a wireless LAN. As illustrated in FIG. 4B, the network system includes the digital camera 100 and the mobile phone 300. The digital camera 100 and the mobile phone 300 can communicate with each other by close proximity wireless communication according to a Bluetooth (trademark) method.

Moreover, the digital camera 100 and the mobile phone 300 can wirelessly communicate with each other according to a wireless LAN method. In a case where the wireless LAN method is employed, the digital camera 100 has a simple AP function, and the mobile phone 300 executes communication according to a method for connecting in an infrastructure mode to a wireless LAN network generated by the digital camera 100.

<Handover>

A concept of handover is described. The term "handover" used in the present exemplary embodiment represents a case in which information for communication to be performed by a second communication method is transmitted and received by a first communication method, and then the communication is performed by the second communication using such information. In the present exemplary embodiment, the expression "handover from first communication to second communication" is used in a case where the information for communication to be performed by the second communication method is first transmitted and received by the first communication method, and then the communication is performed by the second communication method using such information.

In the present exemplary embodiment, a system as illustrated in FIG. 4A enables handover from NEC communication to wireless LAN communication. Moreover, a system as illustrated in FIG. 4B enables handover from Bluetooth (trademark) communication to wireless LAN communication. Examples of the handover are not limited thereto. For example, handover from NFC communication to Bluetooth (trademark) communication can be performed. Each of the first communication method and the second communication method can be optionally set. For example, the first communication method can be set to a lower power consumption method, and the second communication method can be set to a higher transfer speed method. With such settings, the system can be standing by in the first communication method, and the communication method can be shifted to the second communication method when a large amount of data is transferred. Moreover, the first communication method can be set to a more secure communication, and the second communication method can be set to a higher transfer speed method. Such settings enable communication by the second communication method after security is ensured by the first communication method.

<Handover Sequence from NFC Communication to Wireless LAN Communication>

Next, a sequence for handover from NFC communication to wireless LAN communication is described.

Figure 5:
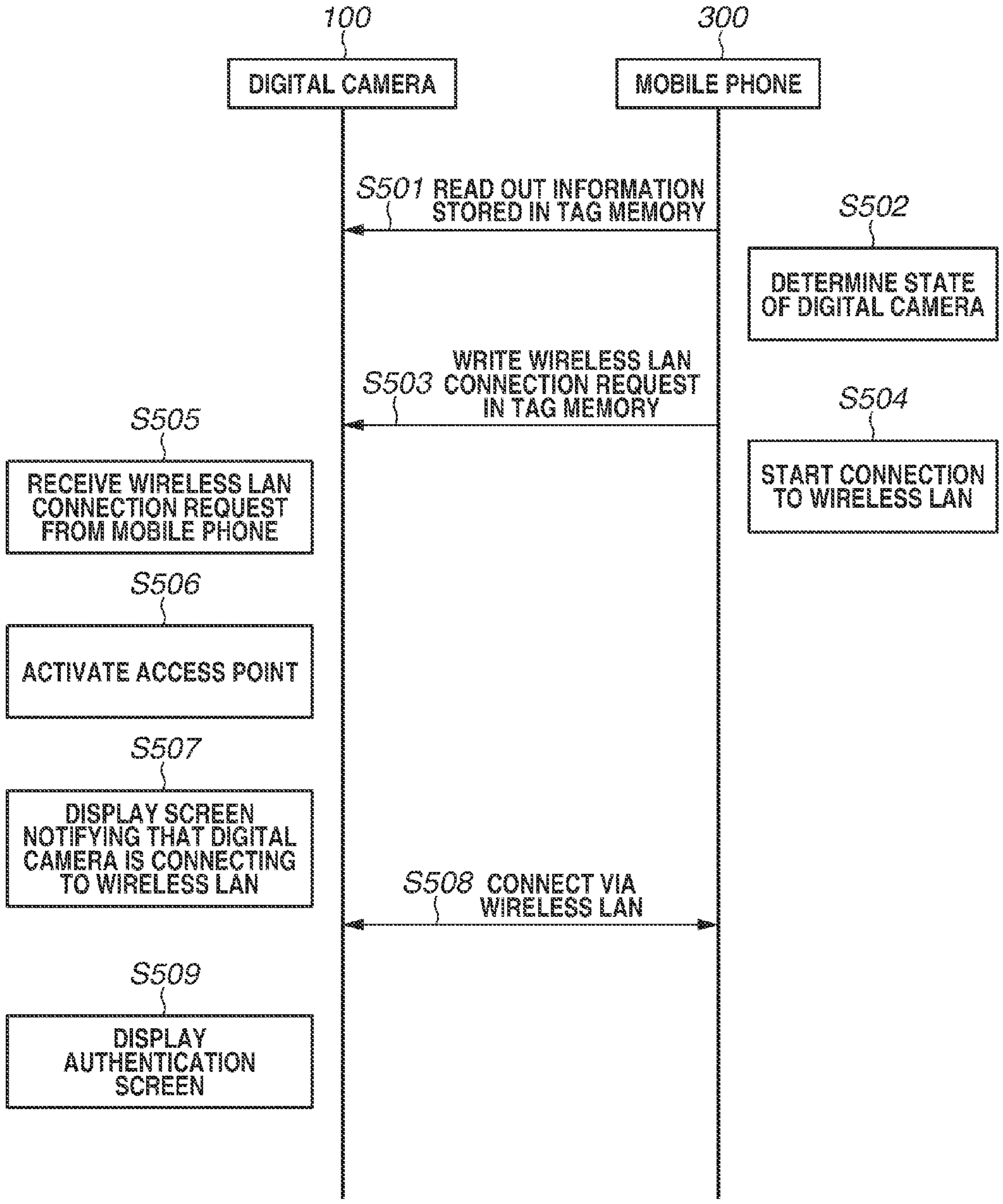
FIG. 5 is a sequence diagram illustrating handover processing from Near Field Communication (NFC) to wireless local area network (LAN) communication.

FIG. 5 illustrates a handover sequence from the NFC communication to the wireless LAN communication, between the digital camera 100 and the mobile phone 300.

In step S501, when the NFC communication is performed, the mobile phone 300 reads out information stored in the tag memory 113 of the digital camera 100 via the NFC communication unit 309. The digital camera 100 of the present exemplary embodiment writes in the tag memory 113 beforehand, the information indicating whether the digital camera 100 is ready for wireless LAN communication. This process will be described below.

In step S502, the mobile phone 300 determines whether the digital camera 100 is connectable to the wireless LAN based on the information read out in step S501.

If the mobile phone 300 determines that the digital camera 100 is connectable to the wireless LAN, then in step S503, the mobile phone 300 writes a wireless LAN connection request in the tag memory 113 via the NFC communication unit 309. If the digital camera 100 is connectable to the wireless LAN, information such as a Service Set Identifier (SSID) needed for the wireless LAN connection is written in the tag memory 113. In step S504, the mobile phone 300 starts connecting to the wireless LAN using such information.

In step S505, if the writing in the tag memory 113 is detected, the digital camera 100 checks the contents of the writing. In the present exemplary embodiment, the digital camera 100 confirms the wireless LAN connection request written in step S503 by the mobile phone 300.

If the digital camera 100 determines that the wireless LAN connection request is written in step S503 by the mobile phone 300, then in step S506, the digital camera 100 is shifted to an AP mode to operate as a simple AP.

Figure 6A:
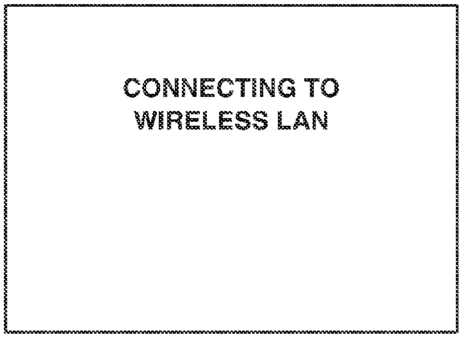
FIGS. 6A, 6B, 6C, and 6D are diagrams each illustrating an example of a screen display of the digital camera.

Herein, in step S507, the digital camera 100 may display a screen notifying that the digital camera 100 is connecting to the wireless LAN on the display unit 106, so that the user can be notified that the close proximity wireless communication has been completed and separation of the digital camera 100 and the mobile phone 300 will not cause a problem. An example of the screen displayed in step S507 is illustrated in FIG. 6A.

In step S508, since the digital camera 100 is operating as the simple AP at this point, the mobile phone 300 executes a wireless LAN connection according to a method for connecting in an infrastructure mode to the wireless LAN network generated by the digital camera 100.

Figure 6B:
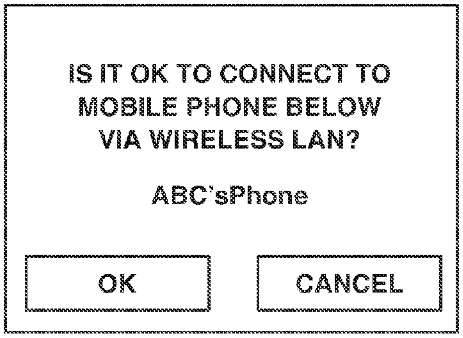

In this case, when the digital camera 100 and the mobile phone 300 are connected via the wireless LAN, the user needs to perform authentication whether the connection is really permitted. Since the NFC communication can be performed by simply bringing devices near to each other, for example, the NFC communication can be performed between mobiles phones of strangers on a crowded train, the authentication is performed to prevent an unintended wireless LAN connection. Thus, in step S509, when the digital camera 100 and the mobile phone 300 are connected via the wireless LAN, the display unit 106 of the digital camera 100 displays an authentication screen. An example of the screen displayed in step S509 is illustrated in FIG. 6B. If the user selects "OK" on the screen illustrated in FIG. 6B, the digital camera 100 transmits notification of connection permission to the mobile phone 300 via the wireless LAN communication. If the user selects "CANCEL" on the screen illustrated in FIG. 6B, the digital camera 100 transmits notification of connection rejection to the mobile phone 300 via the wireless LAN communication.

Herein, a relation between the above sequence and the vari-angle monitor is described. As described above, when the handover from the NFC communication to the wireless LAN communication is performed, the authentication using an authentication screen needs to be performed. However, in a case where the vari-angle monitor is closed, the user cannot visually identify the authentication screen. Consequently, the user is not aware that the authentication is necessary. Moreover, in a case where the user needs to operate the authentication screen using a touch panel, he cannot even perform authentication operation if the vari-angle monitor is closed.

Such problems become more significant in handover processing, particularly, a sequence by which the first communication automatically starts without user operation. For example, since the NFC automatically starts when devices are brought near to a communication range, the communication starts regardless of whether the vari-angle monitor is opened or closed, and may cause the authentication screen to be displayed.

The digital camera 100 according to the present exemplary embodiment is provided in consideration of this point. If the vari-angle monitor is closed, the digital camera 100 according to the present exemplary embodiment writes information indicating that a wireless LAN is in a non-connectable state in the tag memory 113 beforehand. In this case, the mobile phone 300 determines that the digital camera 100 is not connectable to the wireless LAN in step S502, and does not perform the process for writing a wireless LAN connection request in the tag memory 113 in step S503. In addition, the mobile phone 300 does not start the wireless LAN connection in step S504.

<Handover from NFC Communication to Wireless LAN Communication>

Figure 7A:
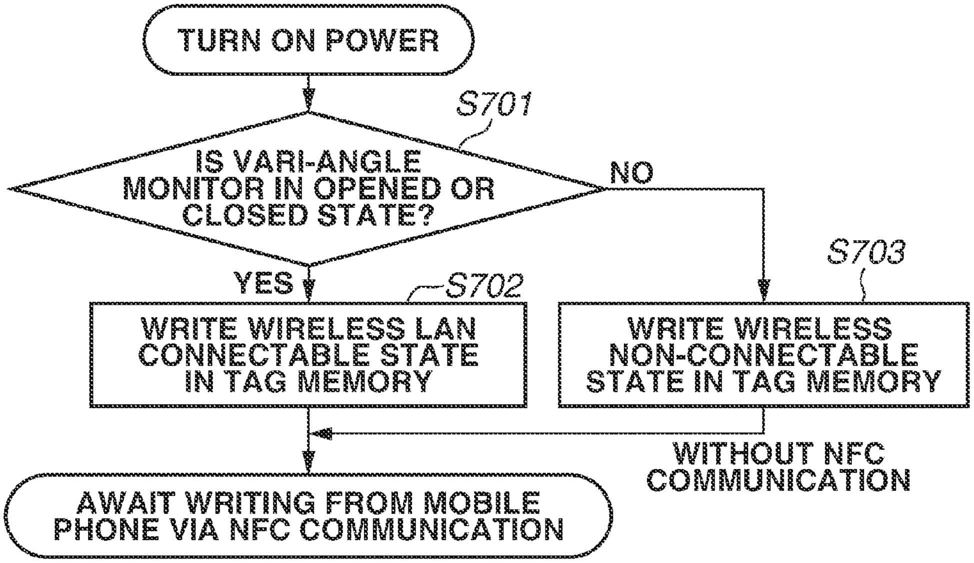
FIGS. 7A and 7B are flowcharts each illustrating processing performed by the digital camera when the handover processing from the NFC communication to the wireless LAN communication is performed.

The digital camera 100 can change contents of the tag memory 113 according to an open/closed state of the vari-angle monitor. Such changes are described using a flowchart illustrated in FIG. 7A.

In step S701, the control unit 101 determines whether the vari-angle monitor is in an open state. If the vari-angle monitor is in the open state (YES in step S701), the operation proceeds to step S702. In step S702, the control unit 101 writes a wireless LAN connectable state in the tag memory 113. At this time, the control unit 101 also writes wireless LAN setting information such as SSID in the tag memory 113.

In this state, when NFC communication is performed between the digital camera 100 and the mobile phone 300, the mobile phone 300 can determine that the digital camera 100 is connectable to the wireless LAN. Accordingly, the mobile phone 300 writes a wireless LAN connection request in the tag memory 113, and makes a wireless LAN connection.

On the other hand, if the digital camera 100 determines that the vari-angle monitor is in a closed state (NO in step S701), the operation proceeds to step S703 in which the control unit 101 writes a wireless LAN non-connectable state in the tag memory 113.

In this case, even if the digital camera 100 and the mobile phone 300 perform the NFC communication, the mobile phone 300 determines that the digital camera 100 is not connectable to the wireless LAN. Accordingly, the mobile phone 300 does not write a wireless LAN connection request in the tag memory 113. Thus, the mobile phone 300 does not make a wireless LAN connection.

Therefore, when the vari-angle monitor is closed, the digital camera 100 and the mobile phone 300 do not attempt to make a wireless LAN connection even if the NFC communication is performed therebetween. This can eliminate an unnecessary wireless LAN connection process.

Therefore, the digital camera 100 according to the present exemplary embodiment writes information in the tag memory 113 based on an open/closed state of the vari-angle monitor. Timing at which the digital camera 100 writes the information in the tag memory 113 is not limited to the time when the power source is ON. The digital camera 100 can execute the processing of the flowchart illustrated in FIG. 7A at predetermined timing. For example, the digital camera 100 can determine whether the vari-angle monitor is in an open state or a closed state, with a predetermined period. The digital camera 100 can execute the processing of the flowchart illustrated in FIG. 7A at timing that change in the open/closed state of the vari-angle monitor is detected.

Next, handover processing from the NFC communication to the wireless LAN communication will be described, which is performed when the digital camera 100 and the mobile phone 300 are brought near to each other.

Figure 7B:
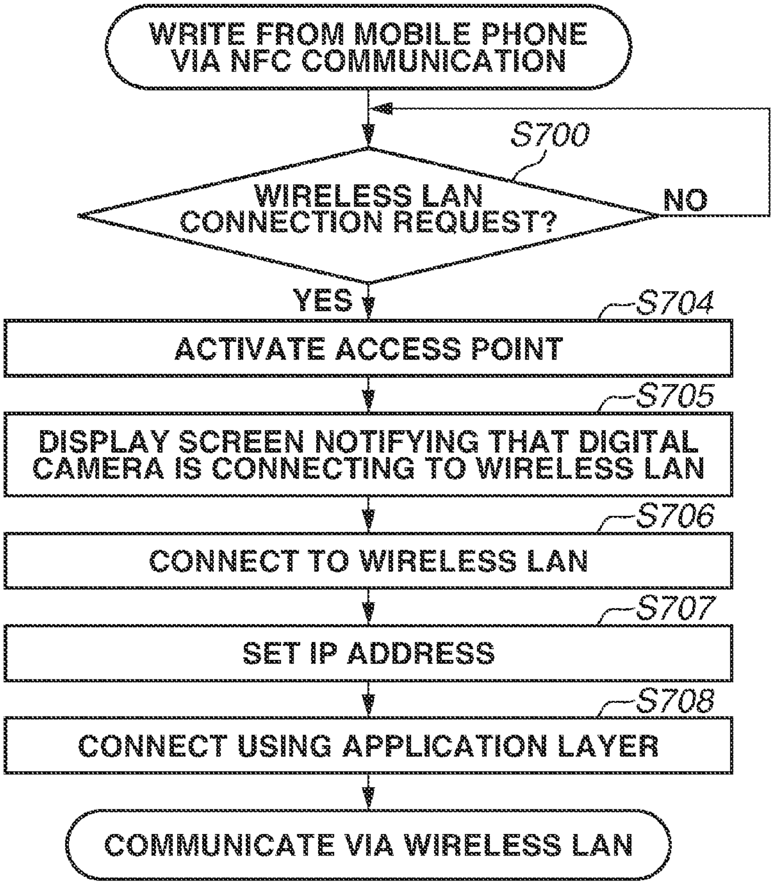

FIG. 7B is a flowchart illustrating the handover processing, from the NFC communication to the wireless LAN communication, performed by the digital camera 100.

Figure 8:
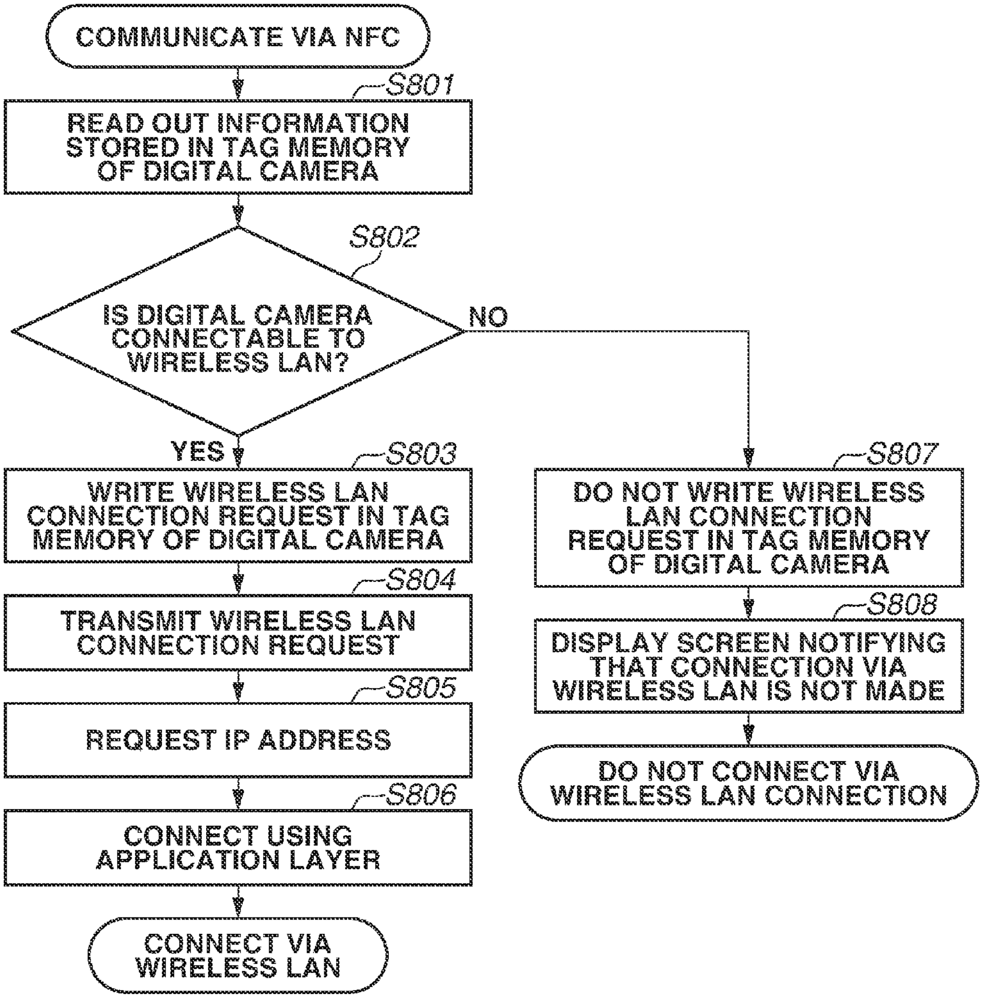
FIG. 8 is a flowchart illustrating processing performed by the mobile phone when the handover processing from the NFC communication to the wireless LAN communication is performed.

FIG. 8 is a flowchart illustrating handover the processing, from the NFC communication to the wireless LAN communication, performed by the mobile phone 300.

The flowchart illustrated in FIG. 8 is first described. In step S801, when a user brings the digital camera 100 and the mobile phone 300 near to each other, the mobile phone 300 communicates with the NFC communication unit 112 of the digital camera 100 via the NFC communication unit 309 functioning as a tag reader, to read out information stored in of the tag memory 113. Subsequently, in step S802, the mobile phone 300 refers to the information read out from the tag memory 113 to determine whether the digital camera 100 is connectable to a wireless LAN. The information used herein is written in step S702 or step S703 of the flowchart illustrated in FIG. 7A.

If the mobile phone 300 determines that the digital camera 100 is connectable to the wireless LAN (YES in step S802), the operation proceeds to step S803. In step S803, the control unit 301 writes a wireless LAN connection request in the tag memory 113 via the NFC communication unit 309. Subsequently, in step S804, the control unit 301 transmits a wireless LAN connection request to the digital camera 100 using wireless LAN setting information such as SSID in the information read out in step S801, and awaits a response.

Figure 6C:
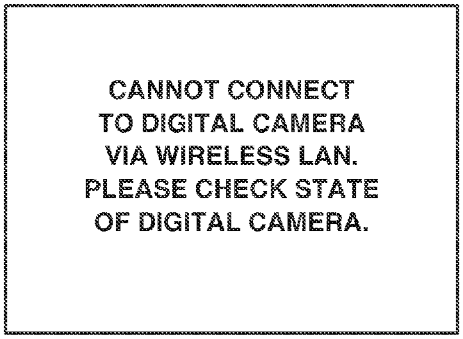

On the other hand, if the mobile phone 300 determines that the digital camera 100 is not connectable to the wireless LAN (NO in step S802), the operation proceeds to step S807. In step S807, the control unit 301 does not writes a wireless LAN connection request in the tag memory 113 of the digital camera 100 via the NFC communication unit 309. Such a process is described as step S807 for the sake of simplicity. However, the operation may proceed from step S802 to step S808 without a determination process or particular process. Naturally, a determination result obtained in step S802 may be stored as information such as a flag. In step S808, the control unit 301 displays a screen for notifying that a wireless LAN connection is not made on the display unit 306, and the processing ends. One example of the screen displayed in step S808 is illustrated in FIG. 6C.

Next, the flowchart illustrated in FIG. 7B is described. In the description above, the mobile phone 300 performs writing in the tag memory 113 of the digital camera 100 by using the NFC communication. The digital camera 100 of the present exemplary embodiment starts the processing illustrated in FIG. 7B in response to the detection of the writing in the tag memory 113.

In step S700, upon receipt of the writing of the wireless LAN connection request in the tag memory 113 from the mobile phone 300 via the NFC communication, the control unit 101 refers to the contents of the writing to determine whether the writing is a wireless LAN connection request. If the control unit 101 determines that the writing is a wireless LAN connection request (YES in step S700), the operation proceeds to step S704. In step S704, the control unit 101 activates a simple AP function of the digital camera 100.

In step S705, the digital camera 100 can display a screen on the display unit 106, notifying that the digital camera 100 is connecting to the wireless LAN.

In step S706, upon receipt of the wireless LAN connection request transmitted in step S804 from the mobile phone 300, the control unit 101 allows the mobile phone 300 to participate in a network generated thereof. In step S707, the control unit 101 receives an Internet Protocol (IP) address acquisition request from the mobile phone 300, and sets an IP address. Herein, the digital camera 100 may operate as a dynamic host configuration protocol (DHCP) server to set an IP address in the mobile phone 300. In step S708, the control unit 101 makes a connection to the mobile phone 300 using an application layer. Herein, for example, the application layer includes a Picture Transfer Protocol (PTP).

Accordingly, the connection is made using the physical layer of the wireless LAN in step S706, the IP layer in step S707, and the application layer in step S708. Hence, the processing for the wireless LAN connection of the digital camera 100 to the mobile phone 300 is completed. Then, the digital camera 100 and the mobile phone 300 can transmit and receive data such as an image via a wireless LAN network. When the wireless LAN connection is made, identification information of the mobile phone 300 is stored as a connection history in the non-volatile memory 103. At that time, information indicating that the wireless LAN connection is made by the handover from the NFC communication is stored in association with identification information of the mobile phone 300. The processing up to this point is performed by the digital camera 100.

The description returns to the processing performed by the mobile phone 300. In step S804 of the flowchart illustrated in FIG. 8, the mobile phone 300 transmits a wireless LAN connection request, and participates in the network generated by the digital camera 100. In step S805, the control unit 301 issues an IP address request to the digital camera 100. At this time, if the digital camera 100 is operating as a DHCP server, the mobile phone 300 acquires the IP address from the digital camera 100 and sets the received IP address as an IP address thereof.

In step S806, the control unit 301 makes a connection to the digital camera 100 by using an application layer.

Thus, the connection is made using the physical layer of the wireless LAN in step S804, the IP layer in step S805, and the application layer in step S806. This enables the digital camera 100 and the mobile phone 300 to exchange, for example, an image via the wireless LAN network.

If the digital camera 100 is not connectable to the wireless LAN (NO in step S802), then in step S807, the control unit 301 does not writes a wireless LAN connection request in the tag memory 113. Subsequently, in step S808, the control unit 301 may display a screen notifying that wireless LAN connection is not to be made, on the display unit 306. An example of the screen displayed herein is illustrated in FIG. 6C.

Therefore, when the digital camera 100 and the mobile phone 300 perform the NFC communication with the vari-angle monitor of the digital camera 100 closed, the wireless LAN connection is not made. This can prevent unnecessary wireless LAN connection from being attempted.

<Handover Sequence from Bluetooth (Trademark) Communication to Wireless LAN Communication>

Handover from Bluetooth (trademark) communication to wireless LAN communication is described. This processing differs from the handover from NFC communication to wireless LAN communication.

Figure 9:
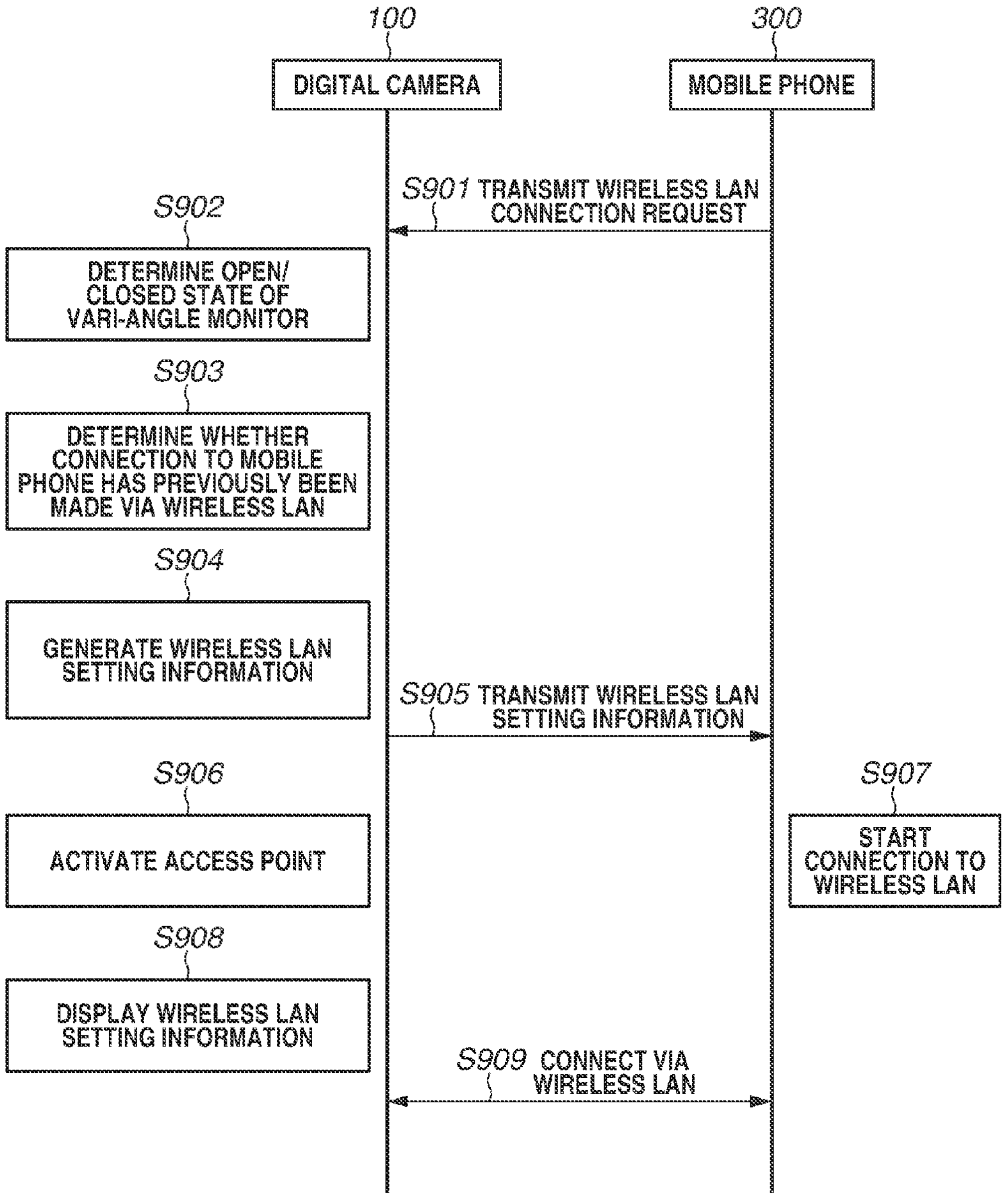
FIG. 9 is a sequence diagram illustrating handover processing from Bluetooth (trademark) communication to the wireless LAN communication.

FIG. 9 is a diagram illustrating a handover sequence from Bluetooth (trademark) communication to wireless LAN communication between the digital camera 100 and the mobile phone 300. Assume that pairing of the digital camera 100 with the mobile phone 300 for Bluetooth (trademark) communication is already completed, and Bluetooth (trademark) communication is already established.

In step S901, the mobile phone 300 transmits a wireless LAN connection request to the digital camera 100 via the Bluetooth (trademark) communication unit 310. This connection request includes identification information such as a device ID for identifying the mobile phone 300.

In step S902, upon receipt of the wireless LAN connection request, the digital camera 100 checks an open/closed state of the vari-angle monitor.

Then, the digital camera 100 checks whether wireless LAN connection to the mobile phone 300 has previously been made. The digital camera 100 according to the present exemplary embodiment retains identification information of a device that has previously established the wireless LAN connection with the digital camera 100 as a connection history. In step S903, the digital camera 100 compares the connection history with the received identification information to determine whether connection to the mobile phone 300 has previously been made via the wireless LAN.

In the present exemplary embodiment, wireless LAN connection methods include handover from NFC communication, handover from Bluetooth (trademark) communication, and operation performed by a user. The digital camera 100 retains information indicating a connection method which has been used for the wireless LAN connection, and identification information of a connection partner, in the non-volatile memory 103. Therefore, the digital camera 100 can refer to the connection method to determine whether the mobile phone 300 has previously established the wireless LAN communication in the handover from the Bluetooth (trademark) communication. Thus, in step S903, among devices that have previously established the wireless LAN communication, the digital camera 100 may determine whether the mobile phone 300 has established wireless LAN communication in the handover from the Bluetooth (trademark) communication.

If the digital camera 100 can make a wireless connection with the mobile phone 300 according to the results of steps S902 and S903, then in step S904, the digital camera 100 generates wireless LAN setting information, and in step S905, the digital camera 100 transmits the wireless LAN setting information to the mobile phone 300. In step S906, the digital camera 100 operates as a simple AP. A criterion for determining whether the wireless LAN connection can be made will be described below.

Figure 6D:
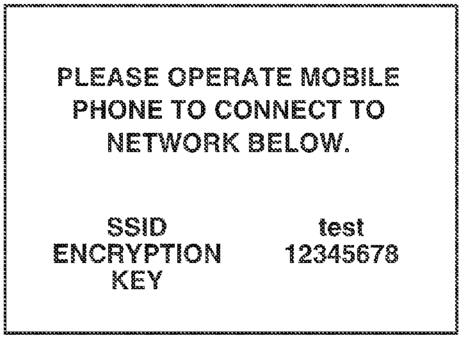

In step S907, the mobile phone 300 starts connecting to the wireless LAN using the received wireless LAN setting information. At this time, since a wireless LAN setting may not be automatically set depending on a type of the mobile phone 300, the user needs to manually set the wireless LAN setting of the mobile phone 300. Accordingly, in step S908, the digital camera 100 displays the wireless LAN setting information on the display unit 106. An example of the screen displayed herein on the display unit 106 is illustrated in FIG. 6D. The user operates the operation unit 305 of the mobile phone 300 to set the wireless LAN setting of the mobile phone 300 while checking the wireless LAN setting information on the screen.

Since the digital camera 100 is operating as a simple AP, in step S909, the mobile phone 300 executes a wireless LAN connection according to a method for connecting in an infrastructure mode to the wireless LAN network generated by the digital camera 100.

Herein, a description is given of the criterion for determining whether the wireless LAN connection process subsequent to step S904 should be performed, based on a state of the vari-angle monitor and the connection history.

As above described, when the handover from the Bluetooth (trademark) communication to the wireless LAN communication is performed, the mobile phone 300 needs to identify wireless LAN setting information (SSID and an encryption key in present exemplary embodiment) of a network generated by the digital camera 100. Accordingly, the digital camera 100 displays a screen illustrated in FIG. 6D so that the user of the mobile phone 300 can input wireless setting information in the mobile phone 300.

However, in a case where the Bluetooth (trademark) communication is performed with the vari-angle monitor closed, the user of the mobile phone 300 cannot identify the contents of the display unit 106, that is, the user cannot identify the wireless LAN setting information. Accordingly, in a case where the vari-angle monitor is closed and a device having no connection history is determined as a connection partner, the digital camera 100 determines that the wireless LAN connection cannot be made. Hence, the digital camera 100 does not perform a subsequent communication establishing process.

On the other hand, a device having a connection history may become a connection partner even in a case where the vari-angle monitor is closed. In such a case, a wireless LAN communication establishing process is performed since mobile phones which have once participated in the network generated by the digital camera 100 often have a function of automatically participating in the network again by using the history information retained therein. In this case, since the user does not need to input the wireless LAN setting information again, the mobile phone 300 can participate in the network generated by the digital camera 100 without the screen illustrated in FIG. 6D. In such a case, the digital camera 100 determines that a wireless LAN connection can be made even if the vari-angle monitor is closed.

Figure 10:
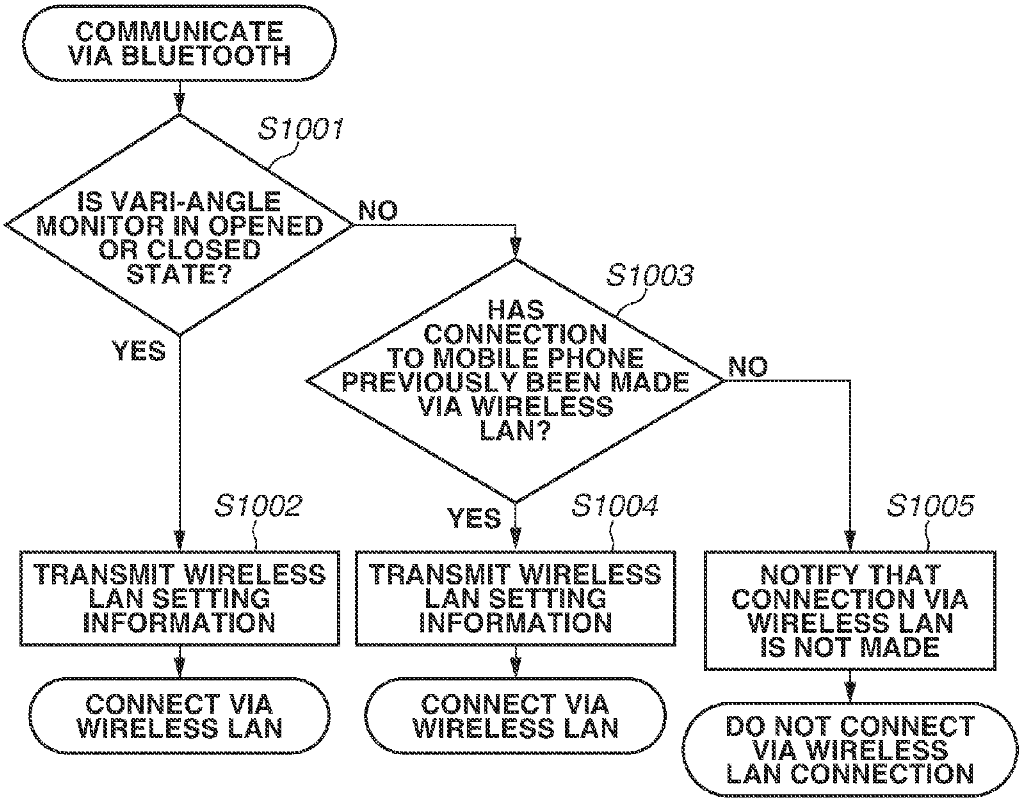
FIG. 10 is a flowchart illustrating processing performed by the digital camera when the handover processing from the Bluetooth (trademark) communication to the wireless LAN communication is performed.

FIG. 10 is a flowchart illustrating processing executed by the digital camera 100 in the handover from Bluetooth (trademark) communication to wireless LAN communication.

In step S1001, when the control unit 101 receives a wireless LAN connection request from the mobile phone 300 via Bluetooth (trademark) communication, the control unit 101 determines whether the vari-angle monitor is in an open state. If the control unit 101 determines that the vari-angle monitor is in the open state (YES in step S1001), the operation proceeds to step S1002. In step S1002, the control unit 101 transmits wireless LAN setting information to the mobile phone 300 to start connecting to a wireless LAN.

The wireless LAN connection processing is similar to that of steps S704 to S708 of the flowchart illustrated in FIG. 7B. When the wireless LAN connection is made, identification information of the mobile phone 300 is stored in the non-volatile memory 103 as the connection history described above. In this case, information indicating that the wireless LAN connection has been made by the handover from the Bluetooth (trademark) communication is stored in association with the identification information of the mobile phone 300.

If the control unit 101 determines that the vari-angle monitor is in a closed state (NO in step S1001), the operation proceeds to step S1003. In step S1003, the control unit 101 determines whether a wireless LAN connection to the mobile phone 300 has previously been made. If the control unit 101 determines that the digital camera 100 has previously been connected to the mobile phone 300 via the wireless LAN (YES in step S1003), the operation proceeds to step S1004. In step S1004, the control unit 101 transmits wireless LAN setting information to the mobile phone 300 to make a wireless LAN connection.

If the control unit 101 determines that the digital camera 100 has not previously been connected to the mobile phone 300 via the wireless LAN (NO in step S1003), the operation proceeds to step S1005. In step S1005, the digital camera 100 notifies of the mobile phone 300 that connection via the wireless LAN is not to be made.

At this time, the mobile phone 300 may display a screen notifying that the wireless LAN connection is not to be made, on the display unit 306.

Therefore, even in a case where the handover from the Bluetooth (trademark) communication to the wireless LAN communication is performed while the vari-angle monitor of the digital camera 100 is being closed, a wireless LAN connection can be made as long as the digital camera 100 and the mobile phone 300 have been previously connected via the wireless LAN.

Other Embodiments

Embodiments of aspects of the present invention can also be realized by a computer of a system or apparatus that reads out and executes computer executable instructions recorded on a storage medium (e.g., non-transitory computer-readable storage medium) to perform the functions of one or more of the above-described embodiment(s) of the aspects of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-020642, filed Feb. 4, 2015, which is hereby incorporated by reference herein in its entirety.

What is claimed is:

1. A communication apparatus comprising:

a first communication unit configured to communicate with an external apparatus using a first communication method;

a movable display unit movable into a first state in which a display screen faces a casing of the communication apparatus and a second state in which the display screen does not face the casing of the communication apparatus; and a control unit, wherein, if the first communication unit receives a predetermined communication start request, the control unit controls information, displayed on the display unit, for predetermined communication with the external apparatus, wherein, after the predetermined communication start request is received, the control unit performs control such that the predetermined communication is performed using the information for the predetermined communication, and wherein, if the display unit is in the first state, the control unit performs control such that the external apparatus recognizes that the predetermined communication cannot be performed.

2. The communication apparatus according to claim 1, further comprising a second communication unit configured to communicate with the external apparatus using a second communication method different from the first communication method, wherein the predetermined communication is performed by the second communication unit.

3. The communication apparatus according to claim 2, further comprising:

a third communication unit configured to communicate with the external apparatus using a third communication method different from the first communication method and the second communication method;

a storage unit configured to store information about an apparatus that has established communication to be performed by the second communication unit; and a comparison unit configured, if the third communication unit receives identification information of the external apparatus, to compare the information stored in the storage unit with external device identification information received by the third communication unit, wherein the control unit determines, based on a comparison result acquired by the comparison unit and a state of the display unit, whether to establish communication by the second communication unit.

4. The communication apparatus according to claim 3, wherein the third communication unit communicates using Bluetooth.

5. The communication apparatus according to claim 1, wherein the first communication unit uses close proximity wireless communication.

6. The communication apparatus according to claim 5, wherein the close proximity wireless communication includes communication performed by near field communication.

7. The communication apparatus according to claim 5, wherein the first communication unit includes a tag memory.

8. The communication apparatus according to claim 7, wherein, if the display unit is in the first state, the control unit writes in the tag memory that the predetermined communication cannot be performed.

9. The communication apparatus according to claim 1, wherein the second communication unit uses a wireless LAN.

10. The communication apparatus according to claim 9, wherein setting information for starting the predetermined communication includes at least one of identification information of a wireless LAN network or an encryption key of the wireless LAN network.

11. The communication apparatus according to claim 9, wherein the communication apparatus operates as an access point for generating the wireless LAN network.

12. The communication apparatus according to claim 1, wherein the communication apparatus is an image capturing apparatus.

13. The communication apparatus according to claim 1, wherein the display unit is a variable angle monitor including a hinge.

14. The communication apparatus according to claim 1, wherein the first state of the display unit is a state in which a user of the communication apparatus cannot visually identify the display screen.

15. A control method for a communication apparatus including a movable display unit movable into a first state in which a display screen faces a casing of the communication apparatus and a second state in which the display screen does not face the casing of the communication apparatus, the control method comprising:

receiving a predetermined communication start request, via a first communication method, for communication with an external apparatus;

displaying information for the predetermined communication on the display unit; and performing the predetermined communication using the information for the predetermined communication after the predetermined communication start request is received, wherein, if the display unit is in the first state, the external apparatus recognizes that the predetermined communication cannot be performed.

16. A computer readable recording medium storing computer executable instructions that cause a computer to execute a control method for controlling a communication apparatus including a movable display unit movable into a first state in which a display screen faces a casing of the communication apparatus and a second state in which the display screen does not face the casing of the communication apparatus, the control method comprising:

receiving a predetermined communication start request, via a first communication method, for communication with an external apparatus;

displaying information for the predetermined communication on the display unit; and performing the predetermined communication using the information for the predetermined communication after the predetermined communication start request is received, wherein, if the display unit is in the first state, the external apparatus recognizes that the predetermined communication cannot be performed.

* * * * *